United States Patent
Ardeli et al.

(10) Patent No.: US 10,993,169 B2
(45) Date of Patent: *Apr. 27, 2021

(54) DEEP PACKET INSPECTION (DPI) AWARE CLIENT STEERING AND LOAD BALANCING IN WIRELESS LOCAL AREA NETWORK (WLAN) INFRASTRUCTURE

(71) Applicant: HEWLETT PACKARD ENTERPRISE DEVELOPMENT LP, Houston, TX (US)

(72) Inventors: Ramesh Ardeli, Sunnyside, CA (US); Hari Krishna Kurmala, Sunnyvale, CA (US); Vamsi Kodavanty, Freemont, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/830,846

(22) Filed: Dec. 4, 2017

(65) Prior Publication Data
US 2018/0092024 A1    Mar. 29, 2018

Related U.S. Application Data

(63) Continuation of application No. 14/445,585, filed on Jul. 29, 2014, now Pat. No. 9,838,948.

(51) Int. Cl.
*H04W 48/02* (2009.01)
*H04W 36/26* (2009.01)
*H04W 48/20* (2009.01)

(52) U.S. Cl.
CPC ........... *H04W 48/02* (2013.01); *H04W 36/26* (2013.01); *H04W 48/20* (2013.01)

(58) Field of Classification Search
None
See application file for complete search history.

(56) References Cited

U.S. PATENT DOCUMENTS

| 4,696,027 | A | 9/1987 | Bonta |
| 5,375,123 | A | 12/1994 | Andersson |
| 5,444,697 | A | 8/1995 | Leung et al. |
| 5,640,677 | A | 6/1997 | Karlsson |
| 5,886,988 | A | 3/1999 | Yun |
| 6,400,951 | B1 * | 6/2002 | Vaara ............... H04W 48/16 455/436 |

(Continued)

*Primary Examiner* — Gregory B Sefcheck

(57) ABSTRACT

Methods and systems are described for intelligently steering client devices operating in an enterprise network system to an appropriate access point based on types of traffic on each client device and/or types of traffic on access points. In particular, client devices may be moved to a different access point when the wireless channel provided by a current access point fails to meet the signal strength requirements of latency sensitive traffic utilized by the client device. Client devices may be further steered to new access points based on load conditions on access points. For example, client devices with low priority traffic sessions may be steered away from access points with high traffic load levels. Accordingly, the methods and systems described herein ensure improved network access for latency sensitive access categories and/or access categories that are considered important to an enterprise system with minimal disruptions to these sessions.

20 Claims, 4 Drawing Sheets

(56) References Cited

U.S. PATENT DOCUMENTS

| | | | |
|---|---|---|---|
| 6,542,742 B2 | 4/2003 | Schramm et al. | |
| 6,782,262 B1 | 8/2004 | Lundborg | |
| 6,836,515 B1 | 12/2004 | Kay et al. | |
| 6,907,243 B1* | 6/2005 | Patel | H04W 52/143 455/442 |
| 6,993,332 B2* | 1/2006 | Pedersen | H04W 36/26 370/329 |
| 7,054,646 B2 | 5/2006 | Naghian | |
| 7,058,077 B1 | 6/2006 | Guo et al. | |
| 7,072,663 B2* | 7/2006 | Ramos | H04W 16/14 455/436 |
| 7,127,056 B2 | 10/2006 | Hu | |
| 7,245,915 B2 | 7/2007 | Matta | |
| 7,289,453 B2* | 10/2007 | Riedel | H04L 47/14 370/252 |
| 7,315,750 B2 | 1/2008 | Chou | |
| 7,542,765 B2 | 6/2009 | Kwun et al. | |
| 7,554,962 B2* | 6/2009 | Takeuchi | H04W 48/20 370/229 |
| 7,630,346 B2 | 12/2009 | Schein | |
| 7,684,800 B2* | 3/2010 | Kuhn | H04W 36/26 370/331 |
| 7,693,093 B2* | 4/2010 | Riedel | H04W 36/26 370/260 |
| 7,729,313 B2* | 6/2010 | Lee | H04W 36/18 370/331 |
| 7,769,384 B2* | 8/2010 | Lee | H04W 36/26 370/331 |
| 7,805,140 B2 | 9/2010 | Friday et al. | |
| 7,809,096 B2 | 10/2010 | Molev-Shteiman et al. | |
| 7,873,359 B2* | 1/2011 | Lee | H04W 36/26 370/331 |
| 7,940,735 B2* | 5/2011 | Kozisek | H04L 45/125 370/310 |
| 7,945,266 B2 | 5/2011 | Chen et al. | |
| 7,986,624 B2 | 7/2011 | Thesling | |
| 8,000,277 B2 | 8/2011 | Momona | |
| 8,023,948 B2 | 9/2011 | Han | |
| 8,064,915 B2 | 11/2011 | Arduini et al. | |
| 8,068,539 B2 | 11/2011 | Molev-Shteiman et al. | |
| 8,156,075 B2 | 4/2012 | Greenwell | |
| 8,169,967 B2 | 5/2012 | Lee et al. | |
| 8,190,191 B2 | 5/2012 | Livet et al. | |
| 8,194,615 B2* | 6/2012 | Sayeedi | H04W 36/385 370/331 |
| 8,275,377 B2 | 9/2012 | Nanda et al. | |
| 8,285,291 B2* | 10/2012 | Dinan | H04W 36/26 455/443 |
| 8,320,479 B2 | 11/2012 | Batachandran et al. | |
| 8,363,617 B2 | 1/2013 | Meyer | |
| 8,364,150 B2 | 1/2013 | Huet et al. | |
| 8,477,720 B2 | 7/2013 | Vikberg et al. | |
| 8,605,586 B2 | 12/2013 | Park et al. | |
| 8,630,256 B2* | 1/2014 | Tinnakornsrisuphap | H04L 47/10 370/330 |
| 8,654,741 B2 | 2/2014 | Lundsgaard et al. | |
| 8,675,563 B2 | 3/2014 | Li et al. | |
| 8,687,539 B2 | 4/2014 | Tay et al. | |
| 8,707,137 B2 | 4/2014 | Arye | |
| 8,724,603 B2 | 5/2014 | Barbu et al. | |
| 8,743,974 B2 | 6/2014 | Nassar et al. | |
| 8,744,439 B2 | 6/2014 | Deivasigamani | |
| 8,780,867 B2 | 7/2014 | Chin et al. | |
| 8,805,379 B2* | 8/2014 | Tiwari | H04W 36/26 455/443 |
| 8,880,061 B2 | 11/2014 | Bhalla | |
| 8,880,071 B2 | 11/2014 | Taaghol | |
| 8,891,490 B2* | 11/2014 | Choi-Grogan | H04W 36/0044 370/332 |
| 8,908,636 B2* | 12/2014 | Klingenbrunn | H04L 47/2491 370/331 |
| 9,019,895 B2 | 4/2015 | Li et al. | |
| 9,030,997 B2 | 5/2015 | Fang et al. | |
| 9,031,551 B2* | 5/2015 | Karla | H04W 24/02 455/414.1 |
| 9,078,267 B2 | 7/2015 | Wu | |
| 9,094,257 B2* | 7/2015 | Morrill | H04L 29/06027 |
| 9,179,479 B2 | 11/2015 | Chaudhuri | |
| 9,232,567 B2* | 1/2016 | Karaoguz | H04L 29/06027 |
| 9,288,139 B2 | 3/2016 | Zhou et al. | |
| 9,307,472 B2 | 4/2016 | Senarath et al. | |
| 9,332,487 B2 | 5/2016 | Taneja | |
| 9,357,431 B2* | 5/2016 | Paladugu | H04W 28/0268 |
| 9,363,788 B2 | 6/2016 | Zhang | |
| 9,380,508 B2* | 6/2016 | Ganu | H04W 36/30 |
| 9,432,971 B2 | 8/2016 | Dai | |
| 9,445,312 B2* | 9/2016 | Thalanany | H04W 36/0011 |
| 9,473,999 B2* | 10/2016 | Hershey | H04W 36/26 |
| 9,491,660 B2 | 11/2016 | Zhao | |
| 9,510,233 B2* | 11/2016 | Agarwal | H04W 28/0289 |
| 9,565,576 B2* | 2/2017 | Tofighbakhsh | H04W 48/18 |
| 9,693,262 B2* | 6/2017 | Gunnarsson | H04W 24/02 |
| 9,713,051 B2* | 7/2017 | Ardeli | H04W 36/08 |
| 9,713,059 B2* | 7/2017 | Cuevas Ramirez | H04W 36/08 |
| 9,736,746 B2* | 8/2017 | Tiwari | H04W 36/26 |
| 9,749,933 B2* | 8/2017 | Andreoli-Fang | H04W 48/12 |
| 9,763,159 B2* | 9/2017 | Sang | H04W 36/0083 |
| 9,794,856 B2* | 10/2017 | Cheng | H04W 48/02 |
| 9,794,857 B2* | 10/2017 | Tomici | H04W 48/16 |
| 9,967,858 B2* | 5/2018 | Bangolae | H04W 36/14 |
| 9,998,947 B2* | 6/2018 | Agarwal | H04W 28/0289 |
| 10,064,058 B2* | 8/2018 | Stammers | H04W 12/0808 |
| 2004/0166864 A1 | 8/2004 | Hill | |
| 2008/0064399 A1 | 3/2008 | Lin | |
| 2008/0137615 A1* | 6/2008 | Park | H04L 45/302 370/332 |
| 2009/0163223 A1 | 6/2009 | Casey | |
| 2010/0184450 A1 | 7/2010 | Tachikawa | |
| 2012/0276945 A1 | 11/2012 | Chindapol | |
| 2015/0230275 A1 | 8/2015 | Kerpez | |
| 2015/0334719 A1 | 11/2015 | Wang | |
| 2016/0014229 A1 | 1/2016 | Seedorf | |
| 2017/0006495 A1 | 1/2017 | Agarwal | |

\* cited by examiner

DEEP PACKET INSPECTION (DPI) AWARE CLIENT STEERING AND LOAD BALANCING IN WIRELESS LOCAL AREA NETWORK (WLAN) INFRASTRUCTURE

RELATED PATENT DATA

Cross-Reference to Related Application

This application claims priority to U.S. patent application Ser. No. 14/445,585, which was filed on Jul. 29, 2014 and is now U.S. Pat. No. 9,838,948, which is herein included by reference in its entirety for all purposes.

TECHNICAL FIELD

The present disclosure relates to steering client devices to an optimal access point based on threshold values associated with a set of session access categories corresponding to the types of traffic transmitted/received by client devices and access points.

BACKGROUND

Over the last decade, there has been a substantial increase in the use and deployment of wireless client devices, from dual-mode smartphones to tablets capable of operating in accordance with a particular Institute of Electrical and Electronics Engineers (IEEE) standard. With "wireless" becoming the de-facto medium for connectivity among users, it has become increasingly important for network systems to intelligently manage connections.

For example, multiple access points may jointly serve a common area. Accordingly, a client device operating in this area may be able to associate with two or more of the access points such that the access points may provide network access to the client device. Although the client device may have many options with respect to access points association, to ensure efficient communications, the network system must determine an optimal access point for the client device.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings in which like references indicate similar elements. It should be noted that references to "an" or "one" embodiment in this disclosure are not necessarily to the same embodiment, and they mean at least one. In the drawings.

DETAILED DESCRIPTION

Figure 1:
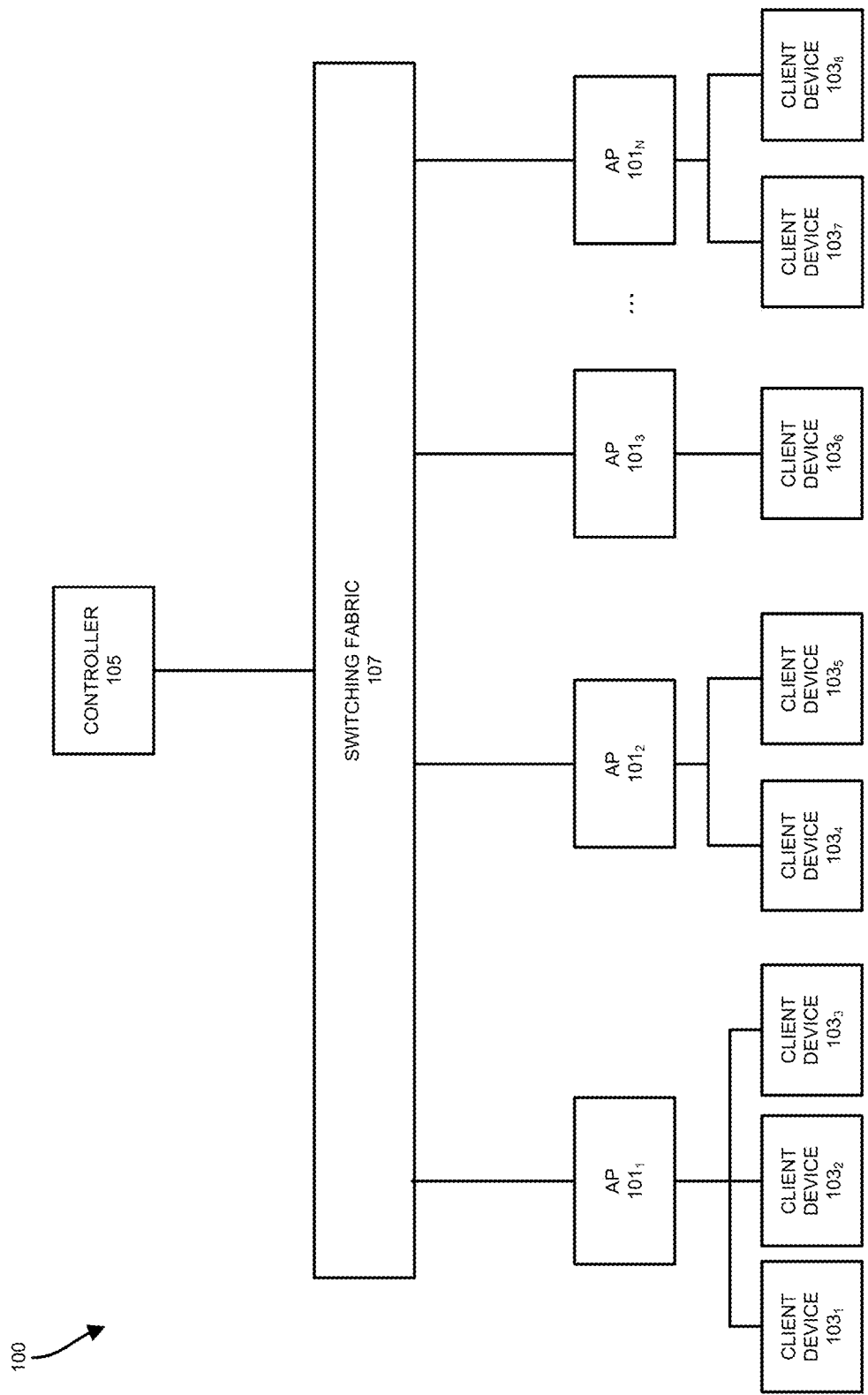
FIG. 1 shows a block diagram example of a network system in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

Herein, certain terminology is used to describe features for embodiments of the disclosure. For example, the term "digital device" generally refers to any hardware device that includes processing circuitry running at least one process adapted to control the flow of traffic into the device. Examples of digital devices include a computer, a tablet, a laptop, a desktop, a netbook, a server, a web server, an authentication server, an authentication-authorization-accounting (AAA) server, a Domain Name System (DNS) server, a Dynamic Host Configuration Protocol (DHCP) server, an Internet Protocol (IP) server, a Virtual Private Network (VPN) server, a network policy server, a mainframe, a television, a content receiver, a set-top box, a video gaming console, a television peripheral, a printer, a mobile handset, a smartphone, a personal digital assistant "PDA", a wireless receiver and/or transmitter, an access point, a base station, a communication management device, a router, a switch, and/or a controller.

It is contemplated that a digital device may include hardware logic such as one or more of the following: (i) processing circuitry; (ii) one or more communication interfaces such as a radio (e.g., component that handles the wireless data transmission/reception) and/or a physical connector to support wired connectivity; and/or (iii) a non-transitory computer-readable storage medium (e.g., a programmable circuit; a semiconductor memory such as a volatile memory and/or random access memory "RAM," or non-volatile memory such as read-only memory, power-backed RAM, flash memory, phase-change memory or the like; a hard disk drive; an optical disc drive; etc.) or any connector for receiving a portable memory device such as a Universal Serial Bus "USB" flash drive, portable hard disk drive, or the like.

Herein, the terms "logic" (or "logic unit") are generally defined as hardware and/or software. For example, as hardware, logic may include a processor (e.g., a microcontroller, a microprocessor, a CPU core, a programmable gate array, an application specific integrated circuit, etc.), semiconductor memory, combinatorial logic, or the like. As software, logic may be one or more software modules, such as executable code in the form of an executable application, an application programming interface (API), a subroutine, a function, a procedure, an object method/implementation, an applet, a servlet, a routine, source code, object code, a shared library/dynamic load library, or one or more instructions. These software modules may be stored in any type of a suitable non-transitory storage medium, or transitory computer-readable transmission medium (e.g., electrical, optical, acoustical or other form of propagated signals such as carrier waves, infrared signals, or digital signals).

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

Network System

FIG. 1 shows a block diagram example of an enterprise network system 100 in accordance with one or more embodiments. The network system 100, as illustrated in FIG. 1, is a digital system that may include a plurality of digital devices such as one or more access points $101_1$-$101_N$ (N>1), client devices $103_1$-$103_8$, and a network controller 105. The client devices $103_1$-$103_8$ may be associated with one of the access points $101_1$-$101_N$ through a corresponding wireless connection such that the client devices $103_1$-$103_8$ are provided with network access (i.e., access to an internal network in which the access points $101_1$-$101_N$ operate and/or access to an external network via the access points $101_1$-$101_N$). Although the client devices $103_1$-$103_8$ may be associated with a single access point $101_1$-$101_N$ at a time, each of the access points $101_1$-$101_N$ may be able to detect wireless signals transmitted from multiple client devices $103_1$-$103_8$. Further, the client devices $103_1$-$103_8$ may be able to detect wireless signals transmitted from multiple access points $101_1$-$101_N$. These detected signals may be used to determine signal strength characteristics (e.g., received signal strength indicator (RSSI) values or signal-to-noise ratios (SNR)) between each access point $101_1$-$101_N$ and each client device $103_1$-$103_8$.

In one embodiment, one or more of the client devices $103_1$-$103_8$ may be steered to another access point $101_1$-$101_N$ based on various factors. For example, in one embodiment, applications for which the access points $101_1$-$101_N$ and/or the client devices $103_1$-$103_8$ provide network access to may be analyzed and categorized. Each of these application categories may thereafter be categorized by access categories, which define the type of network traffic provided by each category of application. For example, as will be described in greater detail below, the access categories may include voice traffic, enterprise-video traffic, non-enterprise-video traffic, best effort traffic, and background traffic. By comparing signal strength characteristics (e.g., RSSI values and SNRs) between signals transmitted to/from the client devices $103_1$-$103_8$ and the access points $101_1$-$101_N$ with an overall threshold and/or access category specific minimum thresholds, client devices $103_1$-$103_8$ may be steered to another access point $101_1$-$101_N$ that is better equipped to provide network access based on the traffic needs of each client device $103_1$-$103_8$. In some embodiments, load based signal strength characteristics/values may be calculated for use when steering client devices $103_1$-$103_8$ to access points $101_1$-$101_N$.

Each of the concepts for steering client devices $103_1$-$103_8$ to access points $101_1$-$101_N$ based on access categories will be described in greater detail below. These techniques may ensure that client devices $103_1$-$103_8$ are associated with access points $101_1$-$101_N$ that are best equipped to provide network access to applications, including latency sensitive applications, through analysis of signal strength characteristics (e.g., RSSI values, SNRs, and/or load factors).

Figure 2:
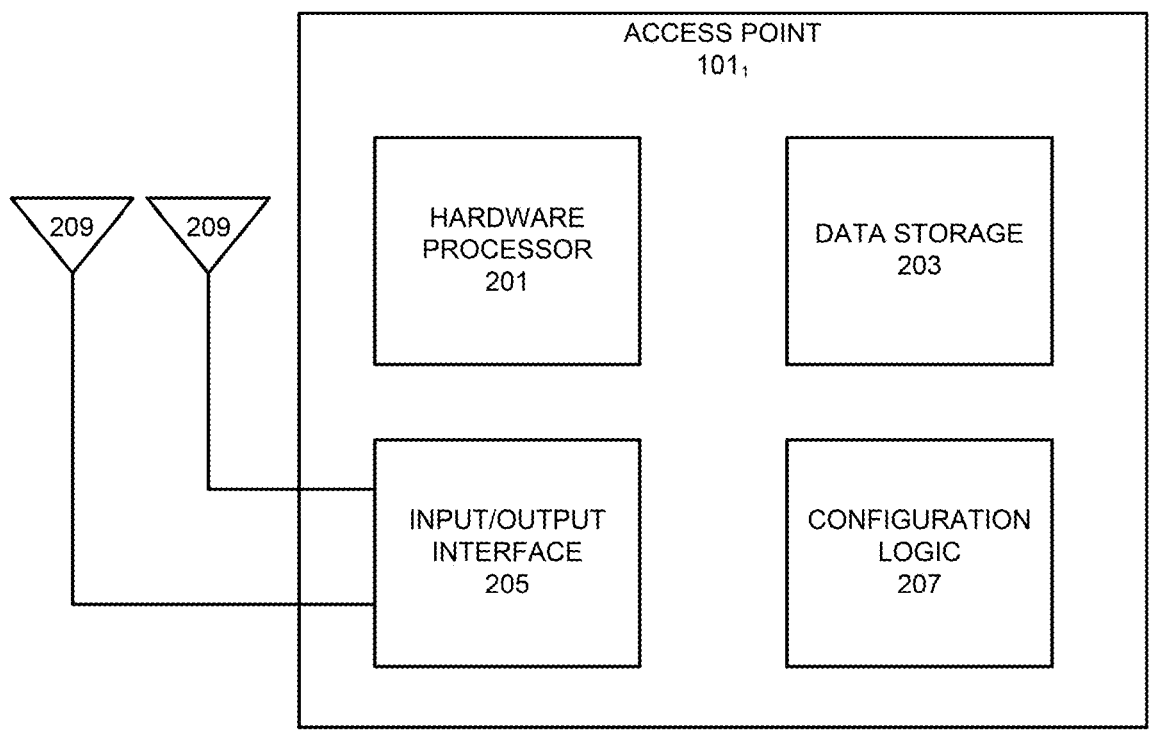
FIG. 2 shows a component diagram of an access point according to one embodiment.

The access points $101_1$-$101_N$ may be any device that can associate with the client devices $103_1$-$103_8$ to transmit and receive data over wireless channels and/or detect wireless signals transmitted by the client devices $103_1$-$103_8$. In one embodiment, the access points $101_1$-$101_N$ may correspond to a network device such as a wireless access point, a switch, a router, or any combination thereof. FIG. 2 shows a component diagram of the access point $101_1$ according to one embodiment. In other embodiments, the access points $101_2$-$101_N$ may include similar or identical components to those shown and described in relation to the access point $101_1$.

As shown in FIG. 2, the access point $101_1$ may comprise one or more of: a hardware processor 201, data storage 203, an input/output (I/O) interface 205, and device configuration logic 207. Each of these components of the access point $101_1$ will be described in further detail below.

The data storage 203 of the access point $101_1$ may include a fast read-write memory for storing programs and data during operations and a hierarchy of persistent memory, such as Read Only Memory (ROM), Erasable Programmable Read Only Memory (EPROM,) and/or Flash memory for example, for storing instructions and data needed for the startup and/or operation of the access point $101_1$. In one embodiment, the data storage 203 is a distributed set of data storage components. The data storage 203 may store data that is to be transmitted from the access point $101_1$ or data that is received by the access point $101_1$. For example, the access point $101_1$ may store data to be forwarded to one or more of the client devices $103_1$-$103_8$ or to one or more of the access points $101_2$-$101_N$.

In one embodiment, the I/O interface 205 corresponds to one or more components used for communicating with other devices (e.g., the client devices $103_1$-$103_8$, the controller 105, and/or the other access points $101_2$-$101_N$ within the system 100 or devices external to the system 100) via wired or wireless signals. The I/O interface 205 may include a wired network interface such as an IEEE 802.3 Ethernet interface and/or a wireless interface such as an IEEE 802.11 WiFi interface. The I/O interface 205 may communicate with the client devices $103_1$-$103_8$, the controller 105, and/or the access points $101_2$-$101_N$ over corresponding wireless channels in the system 100.

In some embodiments, the I/O interface 205 may include one or more antennas 209 for communicating with the client devices $103_1$-$103_8$, the controller 105, the access points $101_2$-$101_N$, other wireless devices in the network system 100, and/or other devices over an external network. For example, multiple antennas 209 may be used for forming transmission beams to one or more of the client devices $103_1$-$103_8$ and/or the access points $101_2$-$101_N$ through adjustment of gain and phase values for corresponding antenna 209 transmissions. The generated beams may avoid objects and create an unobstructed path to the client devices $103_1$-$103_8$ and/or the access $101_2$-$101_N$. In some embodiments, the multiple antennas 209 may be used for performing multipath transmissions and receiving multiple transmission from the client devices $103_1$-$103_8$ or another wireless network device.

In one embodiment, the I/O interface 205 in conjunction with the antennas 209 may detect wireless signals emitted by the client devices $103_1$-$103_8$. In this embodiment, the client devices $103_1$-$103_8$ may not be directly associated with the access point $101_1$ such that each of the client devices $103_1$-$103_8$ and the access point $101_1$ maintain a data connection, but the access point $101_1$ is still able to detect the presence of the proximate/neighboring client device $103_1$ including signal strength characteristics (e.g., RSSI values and SNRs) for corresponding wireless signals. For example, the client device $103_4$ may be associated with the access point $101_2$ such that the access point $101_2$ provides network access to applications running on the client device $103_4$. However, even though an association is not made with the client device $103_4$, the access point $101_1$ may still be in range of the client device $103_4$ such that the access point $101_1$ may detect wireless signals emitted by the client device $103_4$, including signal strength characteristics (e.g., RSSI values and SNRs). Similarly, the client device $103_4$ may be in range of the access point $101_1$ such that the client device $103_4$ may detect wireless signals emitted by the access point $101_1$, including signal strength characteristics (e.g., RSSI values and SNRs). Accordingly, each of the access points $101_1$-$101_N$ may detect nearby signals of the client devices $103_1$-$103_8$ even without an established data connection. Detection of these signals may be used to maintain a virtual beacon report (VBR) table, which chronicles signal strength characteristics (e.g., RSSI values and/or SNRs) between each access point $101_1$-$101_N$ and each client device $103_1$-$103_8$. This VBR table may be stored on any network device, including the controller 105.

In one embodiment, the hardware processor 201 is coupled to the data storage 203 and the I/O interface 205. The hardware processor 201 may be any processing device including, but not limited to a MIPS/ARM-class processor, a microprocessor, a digital signal processor, an application specific integrated circuit, a microcontroller, a state machine, or any type of programmable logic array.

In one embodiment, the device configuration logic 207 includes one or more functional units implemented using firmware, hardware, software, or a combination thereof for configuring parameters associated with the access point $101_1$. For example, the device configuration logic 207 may be used for determining signal strength characteristics for wireless signals between the client devices $103_1$-$103_8$ and the access points $101_1$-$101_N$ and/or triggering the steering of a client device $103_1$-$103_8$ to a new access point $101_1$-$101_N$ based on access category thresholds, traffic load, and/or other factors as will be described in greater detail below.

As described above, the other access points $101_2$-$101_N$ may be similarly configured as described above in relation to the access point $101_1$. For example, the access points $101_2$-$101_N$ may comprise hardware processor 201, data storage 203, input/output (I/O) interface 205, and device configuration logic 207 in a similar fashion as described above in relation to the access point $101_1$.

In one embodiment, the controller 105 may be similarly configured as described above in relation to the access point $101_1$. For example, the controller 105 may comprise hardware processor 201, data storage 203, input/output (I/O) interface 205, and device configuration logic 207 in a similar fashion as described above in relation to the access point $101_1$.

In one embodiment, the client devices $103_1$-$103_8$ may be any wireless electronic devices capable of receiving and transmitting data over wireless mediums. For example, the client devices $103_1$-$103_8$ may be one or more of a personal computer, a laptop computer, a netbook computer, a wireless music player, a portable communication device, a smart phone, a tablet computer, and a digital television. In one embodiment, the client devices $103_1$-$103_8$ are digital devices that include a hardware processor, memory hierarchy, and input/output (I/O) interfaces including a wired and/or wireless interface such as an IEEE 802.11 interface. In one embodiment, the configuration of the components within the client devices $103_1$-$103_8$ may be similar to those discussed above in relation to the access point $101_1$.

Figure 3:
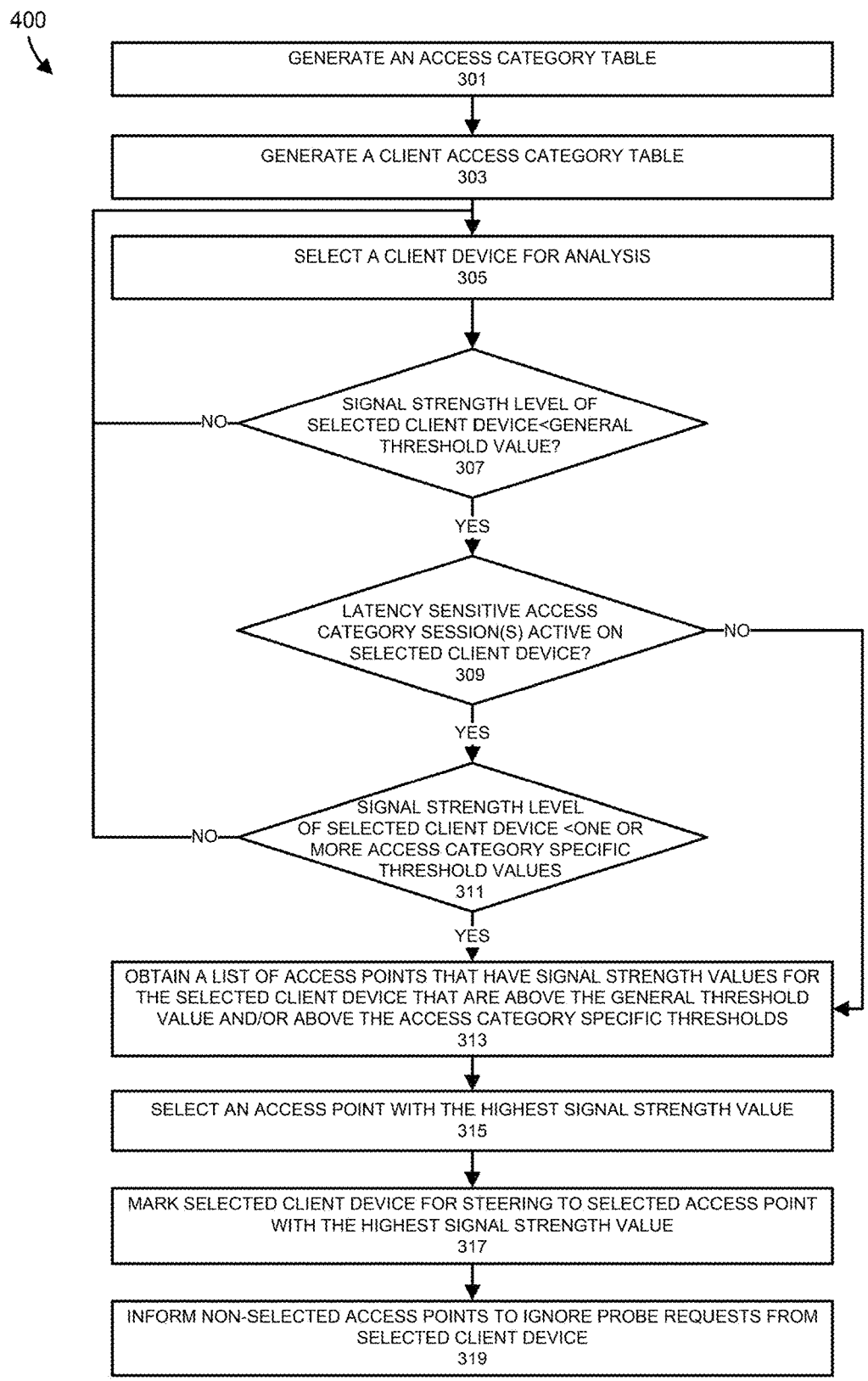
FIG. 3 shows a method for examining client devices to determine client devices that should be steered to different access points according to one embodiment.

Client Device $103_1$-$103_8$ Steering Based on Access Category Signal Strength Characteristics Turning now to FIG. 3, a method 300 for examining client devices $103_1$-$103_8$ to determine client devices $103_1$-$103_8$ that should be steered to different access points $101_1$-$101_N$ will be described. In one embodiment, the method 300 may examine signal strength characteristics between the client devices $103_1$-$103_8$ and the access points $101_1$-$101_N$ to determine whether a client device $103_1$-$103_8$ should be steered away from a currently associated access point $101_1$-$101_N$. This steering decision may improve the network quality provided to the client devices $103_1$-$103_8$ while not negatively impacting latency sensitive applications. Each operation of the method 300 will be described below by way of example.

Although the operations of the method 300 are shown and described in a particular order, in other embodiments the operations may be performed in a different order. For example, in some embodiments, two or more operations of the method 300 may be performed concurrently and/or during overlapping time periods.

In one embodiment, the method 300 may commence at operation 301 with the generation of an access category table. In one embodiment, the generation of the access category table may be performed by a network administrator of the system 100 during setup of the system 100. However, in some embodiments, the access category table may be generated through partially or fully automated techniques. The generation/definition of the access category table may be performed through a command line interface (CLI), a graphical user interface (GUI), or any other similar interface. In some embodiments, the access category table may be periodically updated by the network administrator of the system 100 after setup of the system 100.

In one embodiment, the access category table maps 1) applications running or capable of running on client devices $103_1$-$103_8$ to access-categories, 2) application categories to access categories, and 3) access categories to priority levels. The applications may be any piece of software or process currently or previously running on one of the client devices $103_1$-$103_8$ that utilizes network access provided by an access point $101_1$-$101_N$. For instance, the applications may include the applications shown in Table 1 below.

TABLE 1

| Application Name |
| --- |
| Gmail ® |
| Bit Torrent ® |
| eDonkey |
| Yahoo! ® Messenger |
| WhatsApp ® |
| WeChat ® |
| Twitter ® |
| Facebook ® |
| Youtube ® |
| Netflix ® |
| Skype ® |
| GoToMeeting ® |
| WebEx ® |
| Adobe ® Connect ™ |
| Microsoft ® Lync ®Video |
| Google Talk ® |
| Jabber ® |
| Microsoft ® Lync ® Audio |

The applications may be standalone applications or webpages opened in a browser. For example, a browser may include separate tabs corresponding to a Gmail® website and a Facebook® website respectively. Each of these tabs may correspond to separate applications running on a corresponding client device $103_1$-$103_8$.

In one embodiment, the applications may be mapped to application categories, which define the type of each application. For example, the applications shown in Table 1 may be mapped to application categories as shown in Table 2.

TABLE 2

| Application Name | Application Category |
| --- | --- |
| Gmail ® | Webmail |
| Bit Torrent ® | Peer-to-Peer |
| eDonkey | Peer-to-Peer |
| Yahoo! ® Messenger | Instant Messaging |
| WhatsApp ® | Instant Messaging |
| WeChat ® | Instant Messaging |
| Twitter ® | Web |
| Facebook ® | Web |
| Youtube ® | Web |
| Netflix ® | Audio-Video |
| Skype ® | Instant Messaging |
| GoToMeeting ® | Audio-Video |
| WebEx ® | Audio-Video |
| Adobe ® Connect ™ | Audio-Video |
| Microsoft ® Lync ® Video | Audio-Video |
| Google Talk ® | Instant Messaging |
| Jabber ® | Instant Messaging |
| Microsoft ® Lync ® Audio | Audio-Video |

In Table 2, the applications in each category share one or more characteristics. In one embodiment, the mapping between applications and application categories may be performed by an administrator through the use of a CLI, GUI, or another similar interface. However, in other embodiments the mapping may be performed in a partially or fully automated fashion.

In one embodiment, the application categories may be mapped to access categories. In this embodiment, the access categories define the type of network traffic transmitted/received by applications in each respective access category. For example, the application categories shown in Table 2 may be mapped to access categories as shown in Table 3.

TABLE 3

| Application Name | Application Category | Access Category |
| --- | --- | --- |
| Gmail ® | Webmail | Background |
| Bit Torrent ® | Peer-to-Peer | Background |
| eDonkey | Peer-to-Peer | Background |
| Yahoo! ® Messenger | Instant Messaging | Best-Effort |
| WhatsApp ® | Instant Messaging | Best-Effort |
| WeChat ® | Instant Messaging | Best-Effort |
| Twitter ® | Web | Best-Effort |
| Facebook ® | Web | Best-Effort |
| Youtube ® | Web | Non-Enterprise Video |
| Netflix ® | Audio-Video | Non-Enterprise Video |
| Skype ® | Instant Messaging | Non-Enterprise Video |
| GoToMeeting ® | Audio-Video | Enterprise Video |
| WebEx ® | Audio-Video | Enterprise Video |
| Adobe ® Connect ™ | Audio-Video | Enterprise Video |
| Microsoft ® Lync ® Video | Audio-Video | Enterprise Video |
| Google Talk ® | Instant Messaging | Voice |
| Jabber ® | Instant Messaging | Voice |
| Microsoft ® Lync ® Audio | Audio-Video | Voice |

In one embodiment, the mapping between application categories and access categories may be performed by an administrator through the use of a CLI, GUI, or another similar interface. However, in other embodiments the mapping may be performed in a partially or fully automated fashion.

As shown in Table 3, the access categories include voice, enterprise video, non-enterprise video, best effort, and background categories. In this example, voice traffic may be latency/jitter sensitive rather than bandwidth sensitive. Accordingly, applications/application categories involving voice traffic may be grouped together in this category as these applications/application categories share similar traffic needs/characteristics. However, video applications requiring higher bandwidth and less affected by latency issues may be categorized into separate corresponding video categories (e.g., enterprise video or non-enterprise video). Accordingly, each application in a particular access category is associated with similar types of data traffic.

Although described as including five access categories, in other embodiments, more or less categories may be used by the system 100. For example, in one embodiment, the access categories defined by IEEE 802.11e may be used in place of the access categories shown in Table 3 and described above.

In one embodiment, the access categories may be mapped to priorities. The priorities define the importance of the network traffic associated with each access category to the system 100 and/or the potential harm that may be caused to an access category based on poor latency. Accordingly, latency sensitive access categories (e.g., voice) and/or access categories used for high importance tasks (e.g., enterprise/non-personal video) may receive higher priorities as shown in Table 4.

TABLE 4

| Application Name | Application Category | Access Category | Priority |
| --- | --- | --- | --- |
| Gmail ® | Webmail | Background | |
| Bit Torrent ® | Peer-to-Peer | Background | |
| eDonkey | Peer-to-Peer | Background | |
| Yahoo! ® Messenger | Instant Messaging | Best-Effort | |
| WhatsApp ® | Instant Messaging | Best-Effort | |
| WeChat ® | Instant Messaging | Best-Effort | Low |
| Twitter ® | Web | Best-Effort | |
| Facebook ® | Web | Best-Effort | |
| Youtube ® | Web | Non-Enterprise Video | |
| Netflix ® | Audio-Video | Non-Enterprise Video | |
| Skype ® | Instant Messaging | Non-Enterprise Video | |
| GoToMeeting ® | Audio-Video | Enterprise Video | |
| WebEx ® | Audio-Video | Enterprise Video | High |
| Adobe ® Connect ™ | Audio-Video | Enterprise Video | |
| Microsoft ® Lync ® Video | Audio-Video | Enterprise Video | |
| Google Talk ® | Instant Messaging | Voice | |
| Jabber ® | Instant Messaging | Voice | |
| Microsoft ® Lync ® Audio | Audio-Video | Voice | |

In one embodiment, Table 4 represents the access category table as generated by operation 301. As shown, the access category "voice" is given high priority, because, voice communications are latency sensitive. Further, enterprise video sessions are given priority over non-enterprise video sessions because the system 100 is presumed to be more interested in efficiency of enterprise/work related activities than non-enterprise/personal activities. The access categories best effort and background are respectively assigned the last two priorities, as these classes of traffic are both not latency sensitive and not considered important to the enterprise system 100.

In one embodiment, the assignment of priorities to access categories may be performed by an administrator through the use of a CLI, GUI, or another similar interface. However, in other embodiments the mapping may be performed in a partially or fully automated fashion.

Accordingly, as described above, operation 301 may generate an access category table that maps 1) applications to access-categories, 2) application categories to access categories, and 3) access categories to priority levels. This access category table may be periodically updated by an administrator based on the changing needs of the enterprise system 100.

At operation 303, a client access category table may be generated. In one embodiment, the client access category table is a listing of each client device 103$_1$-103$_8$ and the number of access categories active on each client device 103$_1$-103$_8$ (i.e., the number of sessions in each access category active on each respective client device 103$_1$-103$_8$). Table 5 shows an example client access category table according to one embodiment.

TABLE 5

| Client Device Identifier | Number of Sessions | | | | |
|---|---|---|---|---|---|
| | Voice | Enterprise Video | Non-Enterprise Video | Best-Effort | Back-ground |
| AA:BB:CC:DD:DD:EE:01 | 0 | 0 | 2 | 5 | 10 |
| AA:BB:CC:DD:DD:EE:02 | 0 | 0 | 0 | 5 | 5 |
| AA:BB:CC:DD:DD:EE:03 | 1 | 0 | 0 | 5 | 10 |
| AA:BB:CC:DD:DD:EE:04 | 1 | 0 | 1 | 5 | 10 |
| AA:BB:CC:DD:DD:EE:05 | 0 | 0 | 1 | 0 | 8 |
| AA:BB:CC:DD:DD:EE:06 | 0 | 1 | 0 | 2 | 12 |
| AA:BB:CC:DD:DD:EE:07 | 2 | 0 | 0 | 1 | 20 |
| AA:BB:CC:DD:DD:EE:08 | 1 | 1 | 0 | 0 | 10 |

As shown in Table 5, the client devices 103$_1$-103$_8$ are listed based on a MAC address. Although MAC addresses of the client devices 103$_1$-103$_8$ are used here, in other embodiments any unique identifier of the client devices 103$_1$-103$_8$ may be used to identify the client devices 103$_1$-103$_8$ in the access category table. As shown in Table 5, each client device 103$_1$-103$_8$ is associated with a tally/number of sessions corresponding to each access category. These numbers indicate the quantity of sessions currently running on each respective client device 103$_1$-103$_8$ for each access category. For example, the client device 103$_3$ associated with the MAC address AA:BB:CC:DD:EE:03 may have one voice session, five best effort sessions, and ten background sessions transmitting/receiving network traffic.

In one embodiment, the client access category table may be generated through continual deep packet inspection (DPI) performed on network traffic. For example, in one embodiment, the controller 105 may examine packets destined for the client devices 103$_1$-103$_8$ via the access points 101$_1$-101$_N$ using DPI. Depending on the complexity of the destination/transmitting application, DPI may require multiple packets to classify a traffic session to a particular application. For example, up to seven packets may need to be examined before a session may be terminally classified to a particular application. Based on this application classification, the session may be similarly classified with an access category using the access category table generated at operation 301 (e.g., Table 4). Operation 303 may thereafter update the client access category table based on the classified traffic. Accordingly, for each new session of a client device 103$_1$-103$_8$, the client access category table may be updated to reflect the access category type. Similarly, as sessions are terminated, the client access category table may be updated to reflect these changes.

At operation 305, a client device 103$_1$-103$_8$ may be selected for analysis. In one embodiment, operation 305 may select a client device 103$_1$-103$_8$ from a listing of client devices 103$_1$-103$_8$ in a virtual beacon report (VBR) table. As described above, the VBR table chronicles signal strength characteristics (e.g., RSSI values and/or SNRs) between each access point 101$_1$-101$_N$ and each client device 103$_1$-103$_8$. In one embodiment, the method 300 may continually/periodically cycle through each of the client devices 103$_1$-103$_8$ to determine if any of the client devices 103$_1$-103$_8$ should be steered to new access points 101$_1$-101$_N$ as will be described in the operations to follow. This analysis will determine if steering may improve network access quality without significant disruption to network access for each of the client devices 103$_1$-103$_8$. For example, although network quality may improve upon association with another access point 101$_1$-101$_N$ (e.g., reduced latency), this movement to a new access point 101$_1$-101$_N$ may cause a disruption in network access for the client device 103$_1$-103$_8$ that is outweighed by any potential benefit. For instance, although latency may be slightly high for a voice session running on the client device 103$_3$ and moving the client device 103$_3$ to another access point 101$_1$-101$_N$ may slightly reduce latency during the voice session, the move between access points 101$_1$-101$_N$ may result in dropped packets that are a greater impact on call quality than the slightly high latency introduced by the current access point 101$_1$-101$_N$.

Following selection of a client device 103$_1$-103$_8$ at operation 305, operation 307 may compare signal strength characteristics (e.g., RSSI values and SNRs) between the selected client device 103$_1$-103$_8$ and an associated access point 101$_1$-101$_N$ (i.e., the access point 101$_1$-101$_N$ that the selected client device 103$_1$-103$_8$ is receiving network access through) with a general threshold value. The general threshold value indicates the minimum level signal strength before steering the selected client device 103$_1$-103$_8$ may be appropriate. For example, in one embodiment the general threshold value may be 30 dB. In this example, when the selected client device 103$_1$-103$_8$ has a RSSI value or SNR with an associated client device 103$_1$-103$_8$ that is below 30 dB (i.e., the general threshold value), steering the client device 103$_1$-103$_8$ may be appropriate.

Upon determining at operation 307 that the signal strength characteristics for the selected client device 103$_1$-103$_8$ are above the general threshold value, the method 300 may return to operation 305 to select a new client device 103$_1$-103$_8$ for analysis. However, upon determining at operation 307 that the signal strength characteristics for the selected client device 103$_1$-103$_8$ are below the general threshold value, the method 300 may move to operation 309 to determine if any latency sensitive access category sessions are active on the client device 103$_1$-103$_8$. For example, voice, enterprise video, and/or non-enterprise video access categories may be considered latency sensitive. In this example, when no voice, enterprise video, and/or non-enterprise video sessions are active on the selected client device 103$_1$-103$_8$, the method 300 may move to operation 313, which will be described in greater detail below.

However, upon determining at operation 309 that one or more latency sensitive access category sessions are active on the selected client device 103$_1$-103$_8$ (e.g., voice, enterprise video, and/or non-enterprise video sessions), the method 300 may move to operation 311 to determine if the signal strength characteristics for the selected client device 103$_1$-103$_8$ are below one or more access category specific threshold values. In particular, the comparison at operation 311 may be performed in relation to threshold values for latency sensitive access categories. As described above, in one embodiment, latency sensitive access categories may be access categories that may be particularly affected by rises in latency (e.g., voice, enterprise video, and non-enterprise video).

As noted above, each access category may be associated with access category specific threshold values. For example, the access category voice may be associated with a signal strength threshold value of 20 dB while the access category enterprise video may be associated with a signal strength threshold value of 10 dB. Each of these access category specific threshold values indicate 1) the minimum signal strengths that would allow each corresponding access category to operate without significant latency issues and 2) disruptions caused by a move of the selected client device $103_1$-$103_8$, whose signal strength with a current access point $101_1$-$101_N$ falls below these access category specific thresholds, to a new access point $101_1$-$101_N$ would not be outweighed by latency issues if the selected client device $103_1$-$103_8$ remained at the current access point $101_1$-$101_N$.

In one embodiment, applications in multiple access categories may be active on the selected client device $103_1$-$103_8$ (in particular multiple active latency sensitive sessions). In this embodiment, operation 311 may only compare the signal strength characteristics of the selected client device $103_1$-$103_8$ with the threshold value corresponding to the highest priority access category. For example, a client device 103 may be running a voice session and an enterprise video session. In this example, the access category specific threshold for voice sessions may be 20 dB while the access category specific threshold for enterprise video sessions may be 15 dB. When the signal strength characteristics corresponding to the selected client device 103 and an associated access point 101 indicates a SNR of 17 dB, operation 311 would determine that the signal strength characteristics of the selected client device 103 fails to meet the access category specific thresholds. Accordingly, even though the access category specific threshold for enterprise video is met (e.g., the SNR of the client device 103 is greater than 15 dB), by failing to meet the access category specific threshold associated with the higher priority voice sessions (e.g., the SNR of the client device 103 is less than 20 dB), the signal strength characteristics for the selected client device 103 fail to meet the access category specific thresholds at operation 311.

Following a determination that access category specific thresholds are not met at operation 311 or following a determination that no latency sensitive sessions are active of the selected client device $103_1$-$103_8$ at operation 309, operation 313 may obtain a list of access points $101_1$-$101_N$ that have signal strength characteristics in relation to the selected client device $103_1$-$103_8$ that meet the general threshold value and/or the access category specific thresholds for access categories running on the selected client device $103_1$-$103_8$. As noted above, a VBR table may record signal strength characteristics between each access point $101_1$-$101_N$ and each client device $103_1$-$103_8$. In this embodiment, operation 313 may select one or more access points $101_1$-$101_N$ from the VBR table that have signal strength characteristics corresponding to the selected client device $103_1$-$103_8$ that meet the general threshold value and/or one or more access category specific thresholds.

At operation 315, the access point $101_1$-$101_N$ with the best signal strength characteristics (e.g., highest RSSI value or highest SNR) may be selected from the set of access points $101_1$-$101_N$ generated at operation 313. In one embodiment, this selection at operation 315 may be based on a load factor for each access point $101_1$-$101_N$ from operation 313. In this embodiment, an access point access category table may be generated. The access point access category table is a listing of each access point $101_1$-$101_N$ and the number of access categories active on client devices $103_1$-$103_8$ associated with each respective access point $101_1$-$101_N$. Table 6 shows an example access point access category table according to one embodiment.

TABLE 6

| Access Point Identifier | Number of Sessions | | | | |
|---|---|---|---|---|---|
| | Voice | Enterprise Video | Non-Enterprise Video | Best-Effort | Background |
| FF:GG:HH:II:JJ:KK:01 | 0 | 1 | 2 | 4 | 15 |
| FF:GG:HH:II:JJ:KK:02 | 1 | 0 | 1 | 6 | 5 |
| FF:GG:HH:II:JJ:KK:03 | 1 | 0 | 0 | 5 | 10 |
| FF:GG:HH:II:JJ:KK:04 | 0 | 2 | 3 | 2 | 5 |

In addition to a tally of the number of access categories associated with each access point $101_1$-$101_N$, the access point access category table may also include a load factor N for each access point $101_1$-$101_N$. In one embodiment, the load factor N may be based on 1) the number of access category sessions active on each respective access point $101_1$-$101_N$ and 2) weights applied to each access category. For example, when there are five access categories (i.e., voice, enterprise video, non-enterprise video, best effort, and background access categories) the load factor N for each access point $101_1$-$101_N$ may be calculated by the following equation:

$$N = Pw_v + QW_{ev} + RW_{nev} + SW_{be} + TW_{bg}$$

In the above equation P represents the number of voice sessions currently handled by a particular access point $101_1$-$101_N$, Q represents the number of enterprise video sessions currently handled by a particular access point $101_1$-$101_N$, R represents the number of non-enterprise video sessions currently handled by a particular access point $101_1$-$101_N$, S represents the number of best effort sessions currently handled by a particular access point $101_1$-$101_N$, and T represents the number of background sessions currently handled by a particular access point $101_1$-$101_N$. Further, $w_v$ represents the weight associated with voice sessions, $w_{ev}$ represents the weight associated with enterprise video sessions, $w_{nev}$ represents the weight associated with non-enterprise video sessions, $w_{be}$ represents the weight associated with best effort sessions, and $w_{bg}$ represents the weight associated with background sessions. Accordingly, each access category may be appropriately weighted based on the load anticipated for each associated session on an access point $101_1$-$101_N$. Table 7 below shows an example access point access category table with associated load factors N for each access point $101_1$-$101_N$. In this example, $w_v$=4, $w_{ev}$=20, $w_{nev}$=10, $w_{be}$=2, and $w_{bg}$=1.

TABLE 7

| Access Point Identifier | Number of Sessions | | | | | |
|---|---|---|---|---|---|---|
| | Voice | Enterprise Video | Non-Enterprise Video | Best-Effort | Background | N |
| FF:GG:HH:II:JJ:KK:01 | 0 | 1 | 2 | 4 | 15 | 63 |
| FF:GG:HH:II:JJ:KK:02 | 1 | 0 | 1 | 6 | 5 | 31 |
| FF:GG:HH:II:JJ:KK:03 | 1 | 0 | 0 | 5 | 10 | 24 |
| FF:GG:HH:II:JJ:KK:04 | 0 | 2 | 3 | 2 | 5 | 79 |

In one embodiment, a load based signal strength value may be generated using the load factor N and signal strength characteristics between the selected client device $103_1$-$103_8$ from operation 305 and the list of access points $101_1$-$101_N$ composed at operation 313. For example, the load based signal strength value for each access point $101_1$-$101_N$ from operation 313 may be computed as follows:

$$SNR_2 = SNR - (x*N)$$

Although shown in relation to SNR, the load based signal strength value SNR2 may be generated in relation to any signal strength value (e.g., RSSI values). As shown, the effect of load N is subtracted from the SNR between the selected client device 1031-1038 and an access point 1011-101N. This load factor N may be weighted by the value x. In this embodiment, the highest SNR2 value for the access points 1011-101N from operation 313 may be selected at operation 315 for steering the selected client device 1031-1038.

At operation 317 the selected client device $103_1$-$103_8$ may be marked for steering to the access point $101_1$-$101_N$ selected at operation 315. In this embodiment, at operation 319 each of the access points $101_1$-$101_N$, except for the access point $101_1$-$101_N$ selected at operation 315, may be informed to ignore any probe requests from the selected client device $103_1$-$103_8$. Accordingly, when the selected client device $103_1$-$103_8$ transmits a probe request to each of the access points $101_1$-$101_N$, only the access point $101_1$-$101_N$ selected at operation 315 will respond such that the selected client device $103_1$-$103_8$ may associate with this new/optimal access point $101_1$-$101_N$.

As described above, the method 300 steers a selected client device $103_1$-$103_8$ away from an associated access point $101_1$-$101_N$ when signal strength characteristics fail to meet the latency requirements for one or more latency sensitive sessions. In particular, each access category, corresponding to different traffic types transmitted/received by a selected client device $103_1$-$103_8$, is associated with corresponding specialized thresholds. These access category specific thresholds indicate when latency levels are too high to support traffic described by the access category and when disruptions caused by movement of the selected client device $103_1$-$103_8$ to an optimal access point $101_1$-$101_N$ (e.g., packet drops) are outweighed by latency benefits. Accordingly, the method 300 ensures improved network access for latency sensitive access categories and/or access categories that are considered important to the enterprise system 100 with minimal disruptions to sessions operating on the selected client device $103_1$-$103_8$.

As noted above, the method 300 may be continually performed for client devices $103_1$-$103_8$ in the system 100. In particular, operation 305 may periodically select different client devices $103_1$-$103_8$ in the system 100 for analysis such that each client device $103_1$-$103_8$ may be associated with an optimal access point $101_1$-$101_N$ based on signal strength characteristics and access category specific threshold values.

As described above in relation to the method 300, analysis of each client device $103_1$-$103_8$ may trigger movement of a client device $103_1$-$103_8$ to a new access point $101_1$-$101_N$. This movement described above is based on a wireless channel between a client device $103_1$-$103_8$ and an access point $101_1$-$101_N$ being unable to meet the needs of one or more latency sensitive sessions.

Figure 4:
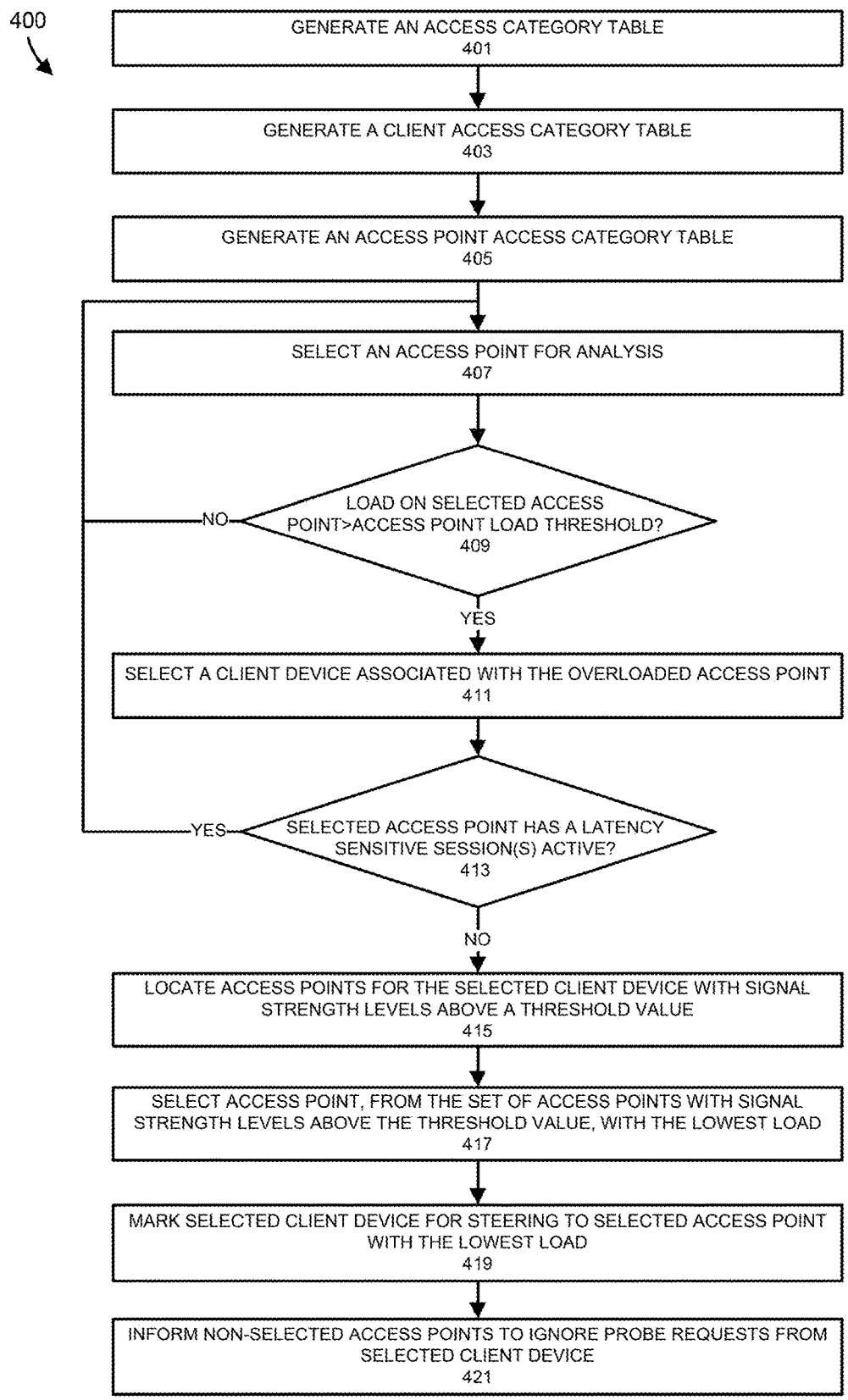
FIG. 4 shows a method for examining access points to determine client devices that should be steered to different access points according to one embodiment.

Turning now to FIG. 4, a method 400 for examining access points $101_1$-$101_N$ to determine client devices $103_1$-$103_8$ that should be steered to different access points $101_1$-$101_N$ will be described. In one embodiment, the steering of client devices $103_1$-$103_8$ may be based on load on the one or more access points $101_1$-$101_N$. For example, a load factor may be computed, which describes the load in relation to access categories on one or more access points $101_1$-$101_N$. When the load on any particular access point $101_1$-$101_N$ exceeds a predefined threshold, a client device $103_1$-$103_8$ associated with this overloaded access point $101_1$-$101_N$ may be steered to a different access point $101_1$-$101_N$ to partially alleviate the overloading. Each operation of the method 400 will be described below by way of example.

Although the operations of the method 400 are shown and described in a particular order, in other embodiments the operations may be performed in a different order. For example, in some embodiments, two or more operations of the method 400 may be performed concurrently and/or during overlapping time periods.

In one embodiment, the method 400 may commence at operation 401 with the generation of an access category table. In one embodiment, the access category table maps 1) applications running or capable of running on client devices $103_1$-$103_8$ to access-categories, 2) application categories to access categories, and 3) access categories to priority levels. The applications may be any piece of software or process currently or previously running on one of the client devices $103_1$-$103_8$ that utilizes network access provided by an access point $101_1$-$101_N$. In one embodiment, the access category table may be similar or identical to Table 4 described above in relation to operation 301 of the method 300.

At operation 403, a client access category table may be generated. In one embodiment, the client access category table is a listing of each client device $103_1$-$103_8$ and the number of access categories active on each client device $103_1$-$103_8$ (i.e., the number of sessions in each access category active on each respective client device $103_1$-$103_8$). In one embodiment, the client access category table may be similar or identical to Table 5 described above in relation to operation 303 of the method 300.

At operation 405, an access point access category table may be generated. The access point access category table is a listing of each access point $101_1$-$101_N$ and the number of access categories active on client devices $103_1$-$103_8$ associated with each respective access point $101_1$-$101_N$. The access point access category table may be similar or identical to Table 6 or Table 7 described above in relation to operation 315 of the method 300.

Following generation of the access point access category table, operation 407 may select an access point $101_1$-$101_N$ for analysis. In one embodiment, the method 400 may cycle through access points $101_1$-$101_N$ in the access point access category table. Accordingly, operation 407 may select the next access point $101_1$-$101_N$ to be analyzed from the access point access category table.

After selection of an access point $101_1$-$101_N$ for analysis at operation 407, operation 409 may compare the current load on the selected access point $101_1$-$101_N$ with an access point load threshold. The access point load threshold indicates a preferred upper load limit for access points $101_1$-$101_N$ in the system 100. Once the access point load threshold has been exceeded by the selected access point $101_1$-$101_N$, the method 400 attempts to move a client device $103_1$-$103_8$ from the overloaded selected access point $101_1$-$101_N$ to a less loaded access point $101_1$-$101_N$ with good signal strength with the client device $103_1$-$103_8$ being moved. The access point load threshold may be set either automatically or by a network administrator. In one embodiment, the comparison at operation 409 may be performed with the load factor N shown in Table 7.

Upon determining that the access point load threshold has not been exceeded by the selected access point $101_1$-$101_N$, the method 400 may return to operation 407 to select another access point $101_1$-$101_N$ for analysis. Conversely, upon determining at operation 409 that the access point load threshold has been exceeded by the selected access point $101_1$-$101_N$, the method 400 may move to operation 411 to attempt to move a client device $103_1$-$103_8$ associated with the selected overloaded access point $101_1$-$101_N$ to another access point $101_1$-$101_N$.

At operation 411, a client device $103_1$-$103_8$ associated with the selected/overloaded access point $101_1$-$101_N$ may be selected for possible movement to a new/less loaded access point $101_1$-$101_N$. In one embodiment, operation 411 may select the client device $103_1$-$103_8$ by examining a VBR table. In this embodiment, the VBR table may indicate the current associations of each of the client devices $103_1$-$103_8$ and each of the access points $101_1$-$101_N$.

Following selection of a client device $103_1$-$103_8$, operation 413 may determine if the client device $103_1$-$103_8$ selected at operation 411 has any active latency sensitive sessions. For example, in one embodiment, operation 413 may determine if the client device $103_1$-$103_8$ selected at operation 411 has any active voice sessions. This determination at operation 413 may be based on the client access category table generated at operation 403. If the client device $103_1$-$103_8$ selected at operation 411 has one or more latency sensitive sessions active, the method 400 may return to operation 411 to select another client device $103_1$-$103_8$ associated with the access point $101_1$-$101_N$ selected at operation 407 for possible movement. By avoiding client devices $103_1$-$103_8$ with active latency sensitive sessions, the method 400 ensures potential moves of the client devices $103_1$-$103_8$ will not negatively impact the user experience for these particularly sensitive sessions.

After finding a client device $103_1$-$103_8$ associated with the selected access point $101_1$-$101_N$ that does not have any latency sensitive sessions active, operation 415 may find a set of access points $101_1$-$101_N$ whose signal strength characteristics with the client device $103_1$-$103_8$ selected at operations 411 and 413 are above a threshold value. In one embodiment, this threshold value may be the general threshold value discussed in relation to the method 300. This general threshold indicates the minimum signal strength acceptable between client devices $103_1$-$103_8$ and access points $101_1$-$101_N$ in the system 100. The general threshold ensures that network access to the selected client device $103_1$-$103_8$ does not fall below a minimum level of quality. In one embodiment, operation 415 may be determined by querying the VBR table for access points $101_1$-$101_N$ that meet the general threshold for the client device $103_1$-$103_8$.

Following the query at operation 415 to find a set of access points $101_1$-$101_N$, operation 417 may select the access point $101_1$-$101_N$ from this set with the lowest load. As described above, the access point access category table generated at operation 405 may include a load factor N. In this embodiment, the access point access category table may be queried in relation to the set of access points $101_1$-$101_N$ from operation 415 to determine the access point $101_1$-$101_N$ with the lowest load factor N. In one embodiment, a load based signal strength value may be used at operation 417 (e.g., $SNR_2$).

At operation 419 the selected client device $103_1$-$103_8$ from operations 411 and 413 may be marked for steering to the access point $101_1$-$101_N$ selected at operation 417. In this embodiment, at operation 421 each of the access points $101_1$-$101_N$, except for the access point $101_1$-$101_N$ selected at operation 417, may be informed to ignore any probe requests from the selected client device $103_1$-$103_8$. Accordingly, when the selected client device $103_1$-$103_8$ transmits a probe request to each of the access points $101_1$-$101_N$, only the access point $101_1$-$101_N$ selected at operation 417 will respond such that the selected client device $103_1$-$103_8$ may associate with this new/optimal access point $101_1$-$101_N$.

In one embodiment, the method 400 may continue to be performed for each access point $101_1$-$101_N$, including previously processed access points $101_1$-$101_N$, until the load on each access point $101_1$-$101_N$ falls below the access point load threshold. As described above, the load on an access point $101_1$-$101_N$ caused by traffic from one or more client devices $103_1$-$103_8$ may be alleviated by intelligently steering client devices $103_1$-$103_8$ away from overloaded access points $101_1$-$101_N$ while not affecting performance of latency sensitive sessions or other important streams of traffic.

An embodiment of the invention may be an article of manufacture in which a machine-readable medium (such as microelectronic memory) has stored thereon instructions which program one or more data processing components (generically referred to here as a "processor") to perform the operations described above. In other embodiments, some of these operations might be performed by specific hardware components that contain hardwired logic (e.g., dedicated digital filter blocks and state machines). Those operations might alternatively be performed by any combination of programmed data processing components and fixed hardwired circuit components. Also, although the discussion focuses on uplink medium control with respect to frame aggregation, it is contemplated that control of other types of messages are applicable.

Any combination of the above features and functionalities may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium for network load balancing, comprising instructions which, when executed by a hardware processor, cause the hardware processor to:
   determine whether a first access point has a load capability to provide network access for a first client device by:
      determining a set of applications running on the first client device;
      based on the determined set of applications, determining a first set of categories associated with the first client device; and
      determining whether the first access point has the load capability based on determining whether the first access point has resources to handle a set of network requirements associated with the first set of categories; and
   responsive to determining that the first access point does not have load capability to provide network access to the first client device,
      determine whether the first client device has any active latency sensitive sessions associated with the first set of categories; and responsive to determining that the client device does not have any active latency sensitive sessions, steer the first client device to the second access point.

2. The medium of claim 1, further comprising instructions to:
determine a set of access points that meet the signal strength requirements associated with the first set of categories of the first client device;
select the second access point from the set of access points based on a load factor associated with each of the access points of the set of access points.

3. The medium of claim 2, further comprising instructions to:
maintain an access category table comprising information about signal strength characteristics of a set of client devices and the set of access points, wherein the information includes information about a set of applications associated with each client device and a priority level associated with each of the categories; and
determine the set of access points that meet the signal strength requirements of the first client device based on the access category table.

4. The medium of claim 1, further comprising instructions to:
determine a second load factor for the second access point based on a number of sessions of each category active on the second access point and a set of weights applied to each respective category.

5. The medium of claim 1, wherein each category of the first set of categories indicates a type of network traffic, and wherein the set of categories comprise one or multiple of: voice, enterprise video, non-enterprise video, best effort, and background.

6. The medium of claim 1, wherein the instructions to determine whether the first access point has resources to handle the set of network requirements associated with the first set of categories comprise instructions to:
compare a first signal strength characteristic of signals transmitted between the first client device and the first access point with a set of thresholds associated with the first set of categories; and
determine whether the first access point has the resources to handle the set of network requirements associated with the first set of categories based on the comparison of the first signal strength characteristic and the set of thresholds.

7. The medium of claim 1, further comprising instructions to:
periodically determine whether each client device of a set of client devices are to be steered to a different access point of a set of access points by:
determining, for the first client device, whether a first signal strength characteristic between the first client device and the first access point associated with the first client device is below a threshold;
determining that the first client device is to be steered to a second access point responsive to determining that the first signal strength characteristics is below the threshold;
determining, for a second client device whether a second signal strength characteristic between the second client device and a second access point associated with the second client device is below the threshold; and
determining that the second client device is not to be steered from the second access point responsive to determining that the first signal strength characteristics is not below the threshold.

8. The medium of claim 1, further comprising instructions to:
determine the set of applications running on the first client device based on a deep packet inspection of network traffic of the first client device.

9. A method for network load balancing, comprising:
determining that a first access point does not have a load capability to provide network access for a first client device by:
determining a set of applications running on the client device;
based on the determined set of applications, determining a first set of categories for the client device; and
determining that the signal strength characteristics between the first access point and the first client device are below a threshold associated with the category; and
responsive to determining that the first access point does not have load capability to provide network access to the first client device,
determining whether the first client device has any active latency sensitive sessions associated with the first set of categories; and
responsive to determining that the first client device does not have any active latency sensitive sessions, steering the client device to a second access point.

10. The method of claim 9, further comprising:
determining a set of access points that meet the signal strength requirements associated with the first set of categories of the first client device;
selecting the second access point from the set of access points based on a load factor associated with each of the access points of the set of access points.

11. The method of claim 10, further comprising:
determining a second load factor for the second access point based on a number of sessions of each category active on the second access point and a set of weights applied to each respective category.

12. The method of claim 10, further comprising:
maintaining an access category table comprising information about signal strength characteristics of a set of client devices and the set of access points, wherein the information includes information about a set of applications associated with each client device and a priority level associated with each of the categories; and
determining the set of access points that meeting the signal strength requirements associated with the set of categories of the first client device based on the access category table,
wherein each category of the first set of categories indicates a type of network traffic, and wherein the set of categories comprise one or multiple of: voice, enterprise video, non-enterprise video, best effort, and background.

13. The method of claim 9, wherein determining whether the first access point has resources to handle the set of network requirements associated with the first set of categories comprises:
comparing a first signal strength characteristic of signals transmitted between the first client device and the first access point with a set of thresholds associated with the first set of categories; and
determining whether the first access point has the resources to handle the set of network requirements associated with the first set of categories based on the comparison of the first signal strength characteristic and the set of thresholds.

14. The method of claim 9, further comprising:
periodically determining whether each client device of a set of client devices are to be steered to a different access point of a set of access points by:
   determining, for the first client device, whether a first signal strength characteristic between the first client device and the first access point associated with the first client device is below a threshold;
   determining that the first client device is to be steered to a second access point responsive to determining that the first signal strength characteristics is below the threshold;
   determining, for a second client device whether a second signal strength characteristic between the second client device and a second access point associated with the second client device is below the threshold; and
   determining that the second client device is not to be steered from the second access point responsive to determining that the first signal strength characteristics is not below the threshold.

15. The method of claim 9, further comprising:
determining the set of applications running on the first client device based on a deep packet inspection of network traffic of the first client device.

16. A system for network load balancing, comprising:
a physical processor that implements machine readable instructions to:
   periodically determine whether each client device of a set of client devices are to be steered to a different access point of a set of access points by:
      determining, for a first client device, whether a first signal strength characteristic between the first client device and a first access point associated with the first client device is below a threshold;
      determining whether any latency active sessions are active on the first client device which are associated with a first set of categories, wherein the first set of categories are determined based on determining a set of applications running on the first client device; and
      determining that the first client device is to be steered to a second access point responsive to determining that the first signal strength characteristics is below the threshold and that no latency sensitive sessions are active on the first client device;
      determining, for a second client device whether a second signal strength characteristic between the second client device and the second access point associated with the second client device is below the threshold; and
      determining that the second client device is not to be steered from the second access point responsive to determining that the first signal strength characteristics is not below the threshold.

17. The system of claim 16, wherein the physical processor implements machine readable instructions to:
select the second access point from the set of access points based on a load factor associated with each of the access points of the set of access points, wherein the load factor for the second access point is based on a number of sessions of each category active on the second access point and a set of weights applied to each respective category.

18. The system of claim 17, wherein the physical processor implements machine readable instructions to:
maintain an access category table comprising information about signal strength characteristics of the set of client devices and the set of access points, wherein the information includes information about a set of applications associated with each client device and a priority level associated with each of the categories; and
determine the set of access points meeting the signal strength requirements associated with the first set of categories of the first client device based on the access category table,
wherein each category of the first set of categories indicates a type of network traffic, and wherein the first and second sets of categories comprise one or multiple of: voice, enterprise video, non-enterprise video, best effort, and background.

19. The system of claim 17, wherein determining whether the first access point has resources to handle the set of network requirements associated with the first set of categories comprises:
comparing a first signal strength characteristic of signals transmitted between the first client device and the first access point with a set of thresholds associated with the first set of categories; and
determining whether the first access point has the resources to handle the set of network requirements associated with the first set of categories based on the comparison of the first signal strength characteristic and the set of thresholds.

20. The system of claim 17, further comprising:
determining the set of applications running on the first client device based on a deep packet inspection of network traffic of the first client device.

* * * * *